United States Patent [19]

Forslund

[11] Patent Number: 5,544,338
[45] Date of Patent: Aug. 6, 1996

[54] APPARATUS AND METHOD FOR RASTER GENERATION FROM SPARSE AREA ARRAY OUTPUT

[75] Inventor: Donald C. Forslund, Wappingers Falls, N.Y.

[73] Assignee: International Business Machines Corporation, Armonk, N.Y.

[21] Appl. No.: 999,049

[22] Filed: Dec. 31, 1992

[51] Int. Cl.⁶ .............................. G06F 12/00; G06F 15/62
[52] U.S. Cl. .................. 395/421.07; 365/189.04; 365/230.04; 365/220; 365/221; 345/200; 345/201
[58] Field of Search ................................ 395/400, 425, 395/164, 166, 401, 421.07, 421.08; 365/189.04, 230.03, 230.04, 221, 220, 239; 345/186, 189, 190, 200, 201; 358/445, 433, 435

[56] References Cited

U.S. PATENT DOCUMENTS

| | | | |
|---|---|---|---|
| 3,774,165 | 11/1973 | McCann, Jr. et al. | 395/873 |
| 4,216,533 | 8/1980 | Ichimiya et al. | 365/230.04 |
| 4,247,920 | 1/1981 | Springer et al. | 365/230.04 |
| 4,394,774 | 7/1983 | Widergren et al. | 382/56 |
| 4,424,522 | 5/1990 | Bray et al. | 345/20 X |
| 4,462,024 | 7/1984 | Strolle | 345/126 |
| 4,468,688 | 8/1984 | Gabriel et al. | 358/22 |
| 4,470,142 | 9/1984 | Ive | 371/2 |
| 4,587,637 | 5/1986 | Ishizuka | 365/189.04 |
| 4,692,379 | 9/1987 | Ikuta | 358/460 |
| 4,703,513 | 10/1987 | Gennery | 382/27 |
| 4,707,610 | 11/1987 | Lindow et al. | 250/560 |
| 4,800,530 | 1/1989 | Itoh et al. | 365/230.04 |
| 4,833,657 | 5/1989 | Tanaka | 365/230.04 |
| 4,875,157 | 10/1989 | Frimmel, Jr. et al. | 395/421.01 |
| 4,875,196 | 10/1989 | Spaderna et al. | 365/189.04 |
| 4,893,279 | 1/1990 | Rahman et al. | 365/230.03 |
| 4,992,955 | 2/1991 | Yabuuchi | 395/123 |
| 5,040,149 | 8/1991 | Ebihara et al. | 365/230.04 X |
| 5,067,019 | 11/1991 | Juday et al. | 348/580 |
| 5,121,360 | 6/1992 | West et al. | 365/230.03 |
| 5,155,829 | 10/1992 | Koo | 395/490 |
| 5,261,064 | 11/1993 | Wyland | 395/421.01 |
| 5,293,623 | 3/1994 | Froniewski et al. | 365/221 |
| 5,296,938 | 3/1994 | Nakayama | 358/460 |
| 5,359,694 | 10/1994 | Concordel | 358/445 |
| 5,396,607 | 3/1995 | Shmatani | 358/460 |

*Primary Examiner*—Jack A. Lane
*Attorney, Agent, or Firm*—Whitham, Curtis, Whitham & McGinn; Eric W. Petraske

[57] ABSTRACT

A camera image data processor provides scan conversion at extremely high speed while allowing static and dynamic correction of image data particularly for a high data output rate CCD image transducer in a confocal imaging system for automated optical inspection in manufacturing processes. Scan conversion and data collation is accomplished at bit rates in excess of 1 Gigabyte by accessing a double buffer memory with different sequences of addresses covering a field of an image corresponding to a field in the memory during read and write operations. Highly parallel output is provided for confocal height data in a raster line by providing a delay equal to an integral multiple of the access time for a field for each confocally imaged height within a sample.

11 Claims, 12 Drawing Sheets

FIG. 10

```
ROW#        PIXEL#
 0      0 □         8 □              1016 □
   1
 2
   3
 4
   5
 6
   7    1 □         9 □              1017 □
 8
   9
10
   11
12
   13
14
   15   2 □        10 □              1018 □
16
   17
18
   19
20
   21
22
   23
24      3 □        11 □              1019 □
   25
26
   27
28                       . . .
   29
30
   31
32      4 □        12 □              1020 □
   33
34
   35
36
   37
38
   39
40      5 □        13 □              1021 □
   41
42
   43
44
   45
46
   47
48      6 □        14 □              1022 □
   49
50
   51
52
   53
54
   55
56      7 □        15 □              1023 □
   57
```

PIXEL AND RASTER SCAN ROW
NUMBERING SCHEME

FIG. 11

| TABLE 1. MEMORY LOCATIONS FILLED DURING ONE FRAME SCAN | | | |
|---|---|---|---|
| PIXEL NUMBER | RASTER SCAN IMAGE ROW | Y PHOTOSITE NUMBER | X PHOTOSITE NUMBER |
| 0 | 0 | 0 | 0 |
| 1 | 8 | 1 | 0 |
| 2 | 16 | 2 | 0 |
| 3 | 24 | 3 | 0 |
| 4 | 32 | 4 | 0 |
| 5 | 40 | 5 | 0 |
| 6 | 48 | 6 | 0 |
| 7 | 56 | 7 | 0 |
| 8 | 0 | 0 | 1 |
| 9 | 8 | 1 | 1 |
| 10 | 16 | 2 | 1 |
| ...1023 | ... | ... | ...127 |

TABLE 2 FORWARD, EVEN, LEFT HALF
REVERSE, EVEN, RIGHT HALF

FIG. 12

| RASTER COUNT | 0 | 1 | 2 | 3 | 4 | 5 | 6 | 7 |
|---|---|---|---|---|---|---|---|---|
| 0 (WRITE) | 0 | 56 | 48 | 40 | 32 | 24 | 16 | 8 |
| 1 (READ) | 8 | 8 | 8 | 8 | 8 | 8 | 8 | 8 |
| 2 (WRITE) | 2 | 58 | 50 | 42 | 34 | 26 | 18 | 10 |
| 3 (READ) | 10 | 10 | 10 | 10 | 10 | 10 | 10 | 10 |
| 4 (WRITE) | 4 | 60 | 52 | 44 | 36 | 28 | 20 | 12 |
| 5 (READ) | 12 | 12 | 12 | 12 | 12 | 12 | 12 | 12 |
| 6 (WRITE) | 6 | 62 | 54 | 46 | 38 | 30 | 22 | 14 |
| 7 (READ) | 14 | 14 | 14 | 14 | 14 | 14 | 14 | 14 |
| 8 (WRITE) | 8 | 0 | 56 | 48 | 40 | 32 | 24 | 16 |
| . | . | . | . | . | . | . | . | . |
| . | . | . | . | . | . | . | . | . |
| 55 (READ) | 62 | 62 | 62 | 62 | 62 | 62 | 62 | 62 |
| 56 (WRITE) | 56 | 48 | 40 | 32 | 24 | 16 | 8 | 0 |
| 57 (READ) | 0 | 0 | 0 | 0 | 0 | 0 | 0 | 0 |
| 58 (WRITE) | 58 | 50 | 42 | 34 | 26 | 18 | 10 | 2 |
| 59 (READ) | 2 | 2 | 2 | 2 | 2 | 2 | 2 | 2 |
| 60 (WRITE) | 60 | 52 | 44 | 36 | 28 | 20 | 12 | 4 |
| 61 (READ) | 4 | 4 | 4 | 4 | 4 | 4 | 4 | 4 |
| 62 (WRITE) | 62 | 54 | 46 | 38 | 30 | 22 | 14 | 6 |
| 63 (READ) | 6 | 6 | 6 | 6 | 6 | 6 | 6 | 6 |

TABLE 3 FORWARD, ODD, LEFT HALF
REVERSE, ODD, RIGHT HALF

FIG. 13

| 0 (READ) | 7 | 7 | 7 | 7 | 7 | 7 | 7 | 7 |
|---|---|---|---|---|---|---|---|---|
| 1 (WRITE) | 1 | 57 | 49 | 41 | 33 | 25 | 17 | 9 |
| 2 (READ) | 9 | 9 | 9 | 9 | 9 | 9 | 9 | 9 |
| 3 (WRITE) | 3 | 59 | 51 | 43 | 35 | 27 | 19 | 11 |
| 4 (READ) | 11 | 11 | 11 | 11 | 11 | 11 | 11 | 11 |
| 5 (WRITE) | 5 | 61 | 53 | 45 | 37 | 29 | 21 | 13 |
| 6 (READ) | 13 | 13 | 13 | 13 | 13 | 13 | 13 | 13 |
| 7 (WRITE) | 7 | 63 | 55 | 47 | 39 | 31 | 23 | 15 |
| 8 (READ) | 15 | 15 | 15 | 15 | 15 | 15 | 15 | 15 |
| . | . | . | . | . | . | . | . | . |
| . | . | . | . | . | . | . | . | . |
| 56 (READ) | 63 | 63 | 63 | 63 | 63 | 63 | 63 | 63 |
| 57 (WRITE) | 57 | 49 | 41 | 33 | 25 | 17 | 9 | 1 |
| 58 (READ) | 1 | 1 | 1 | 1 | 1 | 1 | 1 | 1 |
| 59 (WRITE) | 59 | 51 | 43 | 35 | 27 | 19 | 11 | 3 |
| 60 (READ) | 3 | 3 | 3 | 3 | 3 | 3 | 3 | 3 |
| 61 (WRITE) | 61 | 53 | 45 | 37 | 29 | 21 | 13 | 5 |
| 62 (READ) | 5 | 5 | 5 | 5 | 5 | 5 | 5 | 5 |
| 63 (WRITE) | 63 | 55 | 47 | 39 | 31 | 23 | 15 | 7 |

TABLE 4 REVERSE, EVEN, LEFT HALF
FORWARD, EVEN, RIGHT HALF

FIG. 14

| RASTER COUNT | 0 | 1 | 2 | 3 | 4 | 5 | 6 | 7 |
|---|---|---|---|---|---|---|---|---|
| 0 (WRITE) | 8 | 16 | 24 | 32 | 40 | 48 | 56 | 0 |
| 1 (READ) | 8 | 8 | 8 | 8 | 8 | 8 | 8 | 8 |
| 2 (WRITE) | 10 | 18 | 26 | 34 | 42 | 50 | 58 | 2 |
| 3 (READ) | 10 | 10 | 10 | 10 | 10 | 10 | 10 | 10 |
| 4 (WRITE) | 12 | 20 | 28 | 36 | 44 | 52 | 60 | 4 |
| 5 (READ) | 12 | 12 | 12 | 12 | 12 | 12 | 12 | 12 |
| 6 (WRITE) | 14 | 22 | 30 | 38 | 46 | 54 | 62 | 6 |
| 7 (READ) | 14 | 14 | 14 | 14 | 14 | 14 | 14 | 14 |
| 8 (WRITE) | 16 | 24 | 32 | 40 | 48 | 56 | 0 | 8 |
| ⋮ | ⋮ | ⋮ | ⋮ | ⋮ | ⋮ | ⋮ | ⋮ | ⋮ |
| 55 (READ) | 62 | 62 | 62 | 62 | 62 | 62 | 62 | 62 |
| 56 (WRITE) | 0 | 8 | 16 | 24 | 32 | 40 | 48 | 56 |
| 57 (READ) | 0 | 0 | 0 | 0 | 0 | 0 | 0 | 0 |
| 58 (WRITE) | 2 | 10 | 18 | 26 | 34 | 42 | 50 | 58 |
| 59 (READ) | 2 | 2 | 2 | 2 | 2 | 2 | 2 | 2 |
| 60 (WRITE) | 4 | 12 | 20 | 28 | 36 | 44 | 52 | 60 |
| 61 (READ) | 4 | 4 | 4 | 4 | 4 | 4 | 4 | 4 |
| 62 (WRITE) | 6 | 14 | 22 | 30 | 38 | 46 | 54 | 62 |
| 63 (READ) | 6 | 6 | 6 | 6 | 6 | 6 | 6 | 6 |

TABLE 5 REVERSE, ODD, LEFT HALF
FORWARD, ODD, RIGHT HALF

FIG. 15

| RASTER COUNT | 0 | 1 | 2 | 3 | 4 | 5 | 6 | 7 |
|---|---|---|---|---|---|---|---|---|
| 0 (READ) | 7 | 7 | 7 | 7 | 7 | 7 | 7 | 7 |
| 1 (WRITE) | 9 | 17 | 25 | 33 | 41 | 49 | 57 | 1 |
| 2 (READ) | 9 | 9 | 9 | 9 | 9 | 9 | 9 | 9 |
| 3 (WRITE) | 11 | 19 | 27 | 35 | 43 | 51 | 59 | 3 |
| 4 (READ) | 11 | 11 | 11 | 11 | 11 | 11 | 11 | 11 |
| 5 (WRITE) | 13 | 21 | 29 | 37 | 45 | 53 | 61 | 5 |
| 6 (READ) | 13 | 13 | 13 | 13 | 13 | 13 | 13 | 13 |
| 7 (WRITE) | 15 | 23 | 31 | 39 | 47 | 55 | 63 | 7 |
| 8 (READ) | 15 | 15 | 15 | 15 | 15 | 15 | 15 | 15 |
| ⋮ | ⋮ | ⋮ | ⋮ | ⋮ | ⋮ | ⋮ | ⋮ | ⋮ |
| 56 (READ) | 63 | 63 | 63 | 63 | 63 | 63 | 63 | 63 |
| 57 (WRITE) | 1 | 9 | 17 | 25 | 33 | 41 | 49 | 57 |
| 58 (READ) | 1 | 1 | 1 | 1 | 1 | 1 | 1 | 1 |
| 59 (WRITE) | 3 | 11 | 19 | 27 | 35 | 43 | 51 | 59 |
| 60 (READ) | 3 | 3 | 3 | 3 | 3 | 3 | 3 | 3 |
| 61 (WRITE) | 5 | 13 | 21 | 29 | 37 | 45 | 53 | 61 |
| 62 (READ) | 5 | 5 | 5 | 5 | 5 | 5 | 5 | 5 |
| 63 (WRITE) | 7 | 15 | 23 | 31 | 39 | 47 | 55 | 63 |

APPARATUS AND METHOD FOR RASTER GENERATION FROM SPARSE AREA ARRAY OUTPUT

BACKGROUND OF THE INVENTION

1. Field of the Invention

The present invention generally relates to special purpose data processing circuits and, more particularly, to data processing circuits for image data in automated inspection systems.

2. Description of the Prior Art

Image processing for display generation or feature measurement, extraction or recognition is perhaps the most computation and storage intensive category of data processing problem commonly encountered at the present time. Feature measurement, such as in measurement of cell features in biological applications and the monitoring of coating or layering processes are two examples of applications of automatic feature measurement which require high-speed computation of high accuracy feature measurement data. While the actual processing may be quite simple in some cases, such problems typically involve relatively massive amounts of data. For example, consider that the smallest unit of an image for processing is referred to as a pixel with which the image surface is tiled, often in the form of a matrix. If the resolution of the image is a matrix of one thousand pixels on a side, the complete image will include one million pixels. Each pixel may further contain data representing image values such as color, hue and saturation and other data which represents the relationship to other pixels such as an object number or a location in a three-dimensional scene. Transparency and translucency are often considered and numerous objects in the line of sight may each contribute to the image pixels value and data representing these objects carried with the pixel information. The number of bits of such image value information must be multiplied by the number of pixels in the image to obtain the number of bits necessary to represent the image. Since some operation may be required on any or all of this image data, it can be understood that many millions of data processing operations are required for even modest degrees of spatial and image value resolution.

Accordingly, many approaches have been tried in recent years to reduce the amount of data which must be processed in order to achieve desired levels of throughput from image processing apparatus. Nevertheless, even with high-speed computers, possibly including special purpose co-processors and pipelined architectures, it is not uncommon for the processing of a single image to require several hours to complete. In the field of automated inspection systems, such processing times present a major limitation on throughput of manufacturing processes. However, in some manufacturing fields, such as the manufacturing of electronic circuit devices at high integration densities, there is no viable alternative to automated inspection.

Therefore, the art of image feature measurement, extraction and/or recognition has generally advanced through the development of special purpose image transducers and processing arrangements which are specifically adapted to particular kinds of image features. For example, U.S. Pat. No. 4,424,588 to Satoh, describes processing to detect the position of a symmetrical article. U.S. Pat. No. 4,499,597, to Alves, describes centroid accumulation for small object detection. Pixel values are compared among adjacent pixels to determine the maximum image value pixel in a character segment in U.S. Pat. No. 4,625,330, to Higgins and a similar neighborhood comparison is disclosed in Gennery, U.S. Pat. No. 4,703,513; both being directed to the enhancement of video signals. An arrangement for imaging a three-dimensional device applied to lead frame assembly is disclosed in U.S. Pat. No. 5,030,008, to Scott et al. An optical system for distance measuring is disclosed in U.S. Pat. No. 5,054,926, to Dabbs et al. Some exemplary data processing arrangements for use in image processing systems are also disclosed in U.S. Pat. Nos. 5,016,173, to Kenet et al., 4,918,636, to Iwate et al., 4,963,018, to West, 4,979,221, to Perryman et al., 4,925,302, to Cutler, 4,845,356, to Baker, 4,818,110, to Davidson, and 4,707,610, to Ludlow et al.

This latter patent to Ludlow et al. is directed to the measuring of surface profiles and line width measurements in regard to the manufacture of integrated circuit devices. The wafer to be measured is mounted for oscillatory movement and an optical system focusses a beam on a small spot on the surface. The spot is scanned along the wafer while the focus is progressively changed to derive a series of samples of the surface profile.

More recently, however, it has become desirable to measure a plurality of reflecting profiles within a body of material such as would be presented by a plurality of layers of a semiconductor structure. In such imaging, it may not be possible to, say, follow each profile separately and differentiation of profiles may be difficult. Also, since multiple scanning is relatively slow and potentially could engender positional errors in connection with the different surfaces imaged, it is desirable to sense all profiles in a single scan of the object to be imaged.

As a solution to the above imaging problems, a confocal imaging system is disclosed in U.S. patent application Ser. No. 07/871,458, filed Apr. 21, 1992, now U.S. Pat. No. 5,248,816 entitled TANDEM LINEAR SCANNING CONFOCAL IMAGING SYSTEM, by Wu et al, assigned to the assignee of the present invention and hereby fully incorporated by reference. The system disclosed therein is capable of imaging a plurality of surfaces or partially reflective boundaries within a volume of material simultaneously by utilization of confocal imaging principle which will be discussed in greater detail below.

At the present state of the art in optical transducers (e.g. electronic cameras) as disclosed therein, spatial resolution over the surface (e.g. the x and y directions) of the device and within (e.g. in the z direction) the device is on the order of a few microns or less. Therefore, even a small surface such as that of a chip may involve several million pixels and the profile information may desirably reach the resolving of, say, eight surfaces at eight bits dimensional accuracy. Bit streams of data from each surface are essentially derived simultaneously, in parallel, for each pixel. Accordingly, it is seen that an extremely great quantity of data can be captured. This quantity of data must therefore be stored and processed rapidly to exploit the capabilities of transducers presently available and to accomplish the desired imaging.

Consider also that some attempts to increase processing speed have involved truncation of data. However, such truncation effectively discards information which is present in the original signals from a transducer device. Even truncation is of extremely limited value in reducing data since it is now common to produce integrated circuits having several millions of components, each of which must be imaged with sufficient resolution for meaningful inspection, requiring several pixels for each component or feature of a component. Therefore, data truncation, even to one bit per pixel, is very much limited by the minimum amount of data which is required to achieve the desired inspection function. Further, since data is discarded in the truncation process, the resolution capabilities of transducers would not be fully exploited if data truncation were to be performed.

In summary, the present state of the data processing art does not allow real time data acquisition from an optical transducer which fully exploits the capabilities of transducers which are now possible or allow real time processing of such large amounts of data as are required for a desired degree of optical resolution and with sufficient throughput to provide an automated, real time, inspection system suitable for present manufacturing systems for high density integration electronic components.

A partial solution to the computational problems discussed above is disclosed in U.S. patent application Ser. No. 07/999,323 (Attorney's Docket Number FI9-91-227) now U.S. Pat. No. 5,455,899, filed concurrently herewith, entitled HIGH SPEED IMAGE DATA PROCESSING CIRCUITRY by Donald C. Forslund, which is also assigned to the assignee of the present invention and fully incorporated by reference herein. This high speed image data processing circuitry uses parabola fitting to obtain high resolution height values of a plurality of partially reflecting surfaces within a volume and to output these height values in parallel and in real time in synchronism with the scanning of a camera across the sample being inspected.

The camera used for confocal imaging preferably uses a charge coupled device (CCD) for image capture since such devices are highly responsive to small changes in illumination (e.g. pixel brightness values), on which confocal imaging relies and are easily calibrated and output signal values corrected for so-called fixed pattern noise which occurs because of manufacturing irregularities in CCD devices themselves. CCD's are also attractive since they are essentially self-scanning in response to a multi-phase clock applied thereto and complex scanning circuitry is not required. The self-scanning features of CCD's also can improve the resolution of the devices since very little, if any, image space is consumed by electrical connections to the photosites or switching devices located within the image array, although this is of little significance in the preferred embodiment since a sparse array of photosites is used in the CCD of the preferred embodiment of the camera; that is, the photosites are not contiguously positioned in the preferred CCD.

Nevertheless, the self-scanning nature of CCD's prevents the possibility of massively parallel outputs therefrom. In fact, while a CCD may, in theory be articulated into as many segments as desired and an output taken simultaneously from each segment, the physical layout of CCD's usually prevents more than four segments and effectively prohibits interior segments which do not reach the edge of the imaging area of the device. Therefore, CCD's are not well-suited to providing a plurality of outputs in parallel.

This problem is further complicated by the confocal imaging process, itself, since, as will be explained in greater detail below, when one surface at a given height is being imaged by a particular photosite of the CCD, an adjacent photosite of the CCD will be responsive to a different height and at a different position on the imaged sample. Therefore, even if outputs could be brought out in parallel from every photosite of the CCD, this information would be in a format far different from that required by the high speed data processor disclosed in the above-incorporated application since information regarding surface heights at a particular location require simultaneous presentation of all data from a single sample location. Specifically, in order to perform parabola fitting to obtain high resolution height data, a plurality of intensity values imaged at different heights from the same location on the sample must be present at the same time (e.g. in parallel). Data must be reorganized in location and time-shifted in order to derive useful image information. Time shifting itself is known in the art but usually involves latching or sample-and-hold arrangements which would be prohibitive for the number of photosites from which data is collected from the CCD. Further, since the output from a plurality of photosites of the CCD are necessarily serialized, some commutation between such latches or sample-and-hold circuits would be necessary. Reorganizing in location could also be done by a commutation arrangement but either a large number of commutators would be required to operate in parallel and in synchronism with the time shifting arrangement or a further sampling or latching arrangement would be required. The provision of two cascaded latching stages would, of course, effectively prohibit operation in real time and, in any event, would be very hardware intensive. Therefore it is seen that interfacing from any CCD used in a confocal imaging environment is extremely complex, particularly when it is desired to capture large quantities of data in substantially real time.

SUMMARY OF THE INVENTION

It is therefore an object of the present invention to provide a high speed scan conversion and data collation arrangement to convert data ordered in accordance with a high speed transducer structure to a raster format.

It is another object of the invention to provide scan conversion at a rate comparable to transducers and to support confocal imaging of partially reflective surfaces in parallel at a plurality of nominal confocal heights in near real time.

It is a further object of the invention to provide preprocessing of data in an automated optical inspection system at speeds which will not adversely affect throughput of manufacturing processes being monitored.

In order to accomplish these and other objects of the invention, a method of operating a memory is provided to store and access data in a field thereof including the steps of providing at least two sequences of numbers as partial addresses for the memory, the combination of the partial addresses forming an address sequence accessing all memory locations in the field of said memory, and altering at least a portion of the address sequence to form an altered address sequence during one of write and read operations in said memory, the altered address sequence accessing all locations in the field of the memory.

In accordance with another aspect of the invention, a high speed scan converter is provided comprising a memory including at least two buffers, a first counter for generating a first sequence of multi-bit digital addresses, a second counter for generating a second sequence of multi-bit digital addresses, the second counter operating synchronously with the first counter, means responsive to at least one selected bit of one of the first and second sequences of multi-bit digital addresses for causing a write operation in one of the at least two buffers simultaneously with a read operation in another of said at least two buffers and means for accessing a field of data in said memory in accordance with said first and second sequences of multi-bit addresses including means for substituting an altered pattern of addresses for at least a portion of the first and second digital address sequences during one of read and write operations of the at least two buffers.

BRIEF DESCRIPTION OF THE DRAWINGS

The foregoing and other objects, aspects and advantages will be better understood from the following detailed description of a preferred embodiment of the invention with reference to the drawings, in which:

FIG. 10 illustrates a pixel numbering convention as discussed in connection with FIGS. 9 and 11–15, and FIGS. 11, 12, 13, 14 and 15 are tables illustrating the cyclical repetition sequence of memory accesses in accordance with a preferred embodiment of the invention.

DETAILED DESCRIPTION OF A PREFERRED EMBODIMENT OF THE INVENTION

Figure 1:
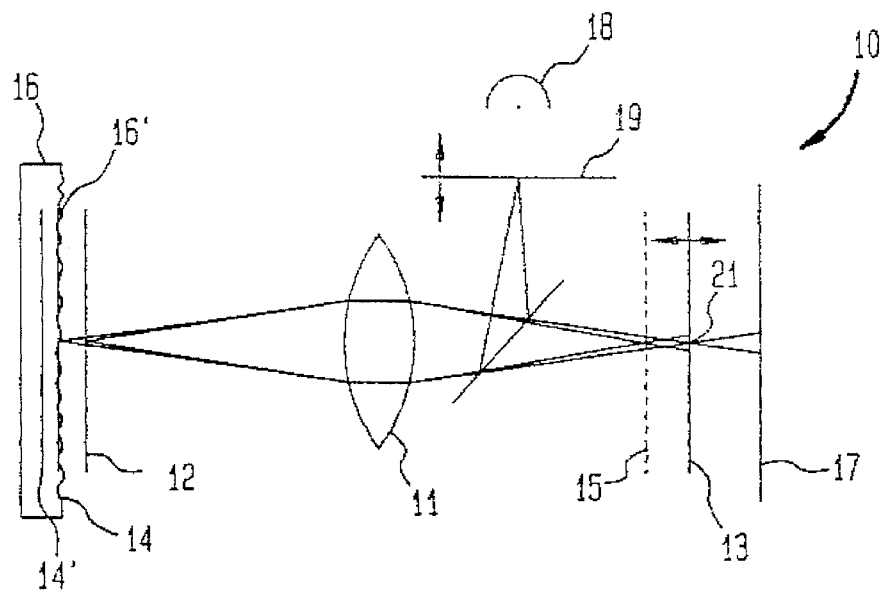
FIG. 1 is a schematic illustration of the principles of a confocal depth imaging arrangement.

Referring now to the drawings, and more particularly to FIG. 1, there is shown, in schematic form, a confocal optical depth measurement system 10 as used in the present invention. The basic principle of confocal depth measurement is that a simple lens or a lens system 11 will have both front and rear focal planes. That is, an image of an object a given distance from the lens center will be brought into best focus on the opposite side of the lens at a known distance from the center of the lens related to the focal length of the lens. For example, an object at plane 12 will be brought into best focus at plane 13 and an object in plane 14 will be brought into best focus at plane 15. Thus, pairs of planes are generated at distance from the center of lens 11 which are referred to as confocal points.

In order to measure the height of points on a variable height surface 16' of an object 16, a focussed spot of radiant energy illumination from source 18 is formed at a point on or near the surface 16'. This is normally done by varying the position of pinhole aperture 19 to vary the position of the focussed point of light in the z direction (e.g. substantially along the lens axis) over a range generally indicated by 12 and 14'. This is done to avoid a requirement for sensing best focus at the surface being measured.

The reflection from surface 16' is then focussed at the point which is confocal to the position in the z direction at which the currently scanned position on object 16 is located. If a pinhole aperture 21 is also moved through a range of planes corresponding to the confocal points of heights of best focus of the image of pinhole 18, small changes in height of the surface 16' result in large swings in the amount of light reaching transducer plane 17 through aperture 21 because maximum transmission of light through the pinhole 21 will only occur when the plane of pinhole 21 is confocal to the distance of the surface 16' from the lens center. For example, light reflected from plane 14 is brought into best focus at plane 15 and the defocussed image at the particular pinhole plane 13, illustrated in FIG. 1, is larger than the pinhole. Thus the pinhole substantially attenuates the light passing to the transducer plane 17 if the reflected light is defocussed, producing a larger image at both surface 16' and pinhole aperture 21. Any defocussing of the image of pinhole 19 at either surface 16' or pinhole 21 thus causes attenuation of light reaching a transducer at plane 17. As a result, assuming a partially reflecting surface of interest will have a constant reflectivity, variation in intensity of light at the transducer directly translates into height variation from a predetermined height.

Figure 2:
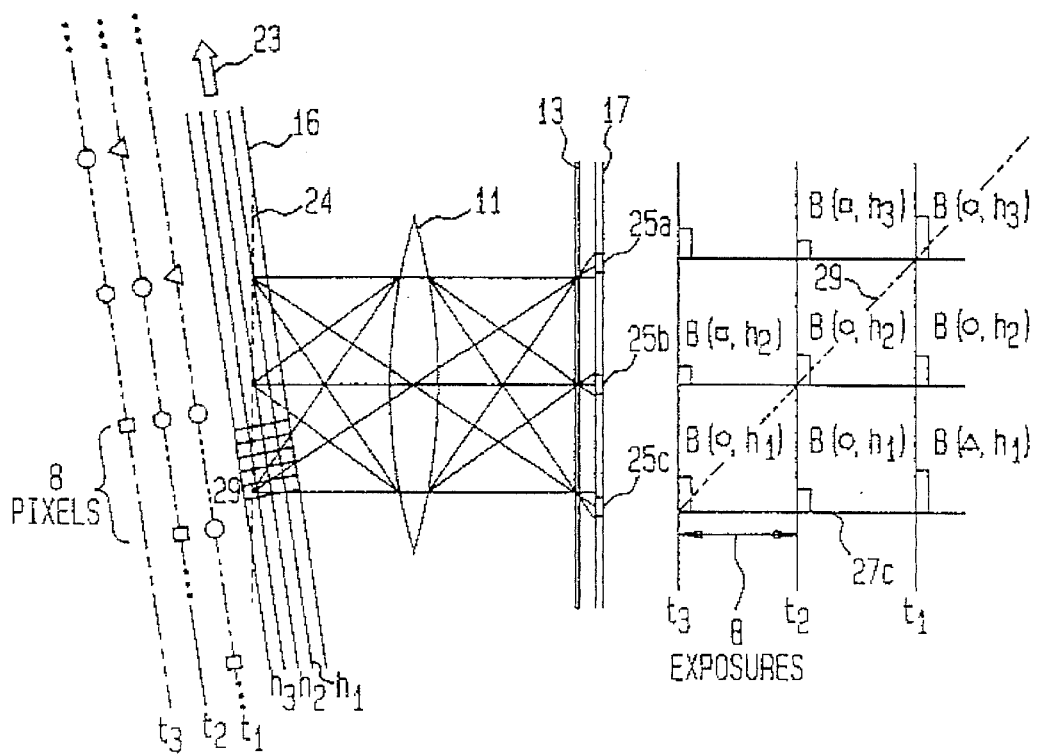
FIG. 2 is a schematic illustration of the manner in which confocal imaging is employed in a preferred embodiment of the invention.

The principles of confocal imaging at different heights within a sample are employed in the preferred embodiment of the camera in a fashion more specifically illustrated in FIG. 2. Most evidently, aperture plate 13 is provided with a matrix of apertures which correspond to the layout of transducing areas or photosites (e.g. 25a, 25b, 25c) on CCD 17. Further, the sample is slightly inclined relative to confocal plane 24 the planes of the transducer array 17, aperture plate 13 and lens 11 and CCD 17 (e.g. rotated about an axis orthogonal to the major direction of scan 23 across the sample), so that each aperture in the aperture plate (or a sub-array thereof) corresponds to a different height within the sample. (As is well-understood in optics design, this could also be achieved by tilting of the lens axis or a combination of the two could also be used,) By the same token, the confocal plane 24 across the field of view of the camera is made to cut through a range of heights of interest within the sample. Therefore, in a simplest case, the camera will be imaging a plurality of areas on the sample, each potentially at a different height. The sample is scanned across the field of view of the camera, as indicated by arrow 23. In this arrangement, for each "exposure" instant (e.g. when the transducer samples incident light at all photosites and during which the sample may be considered to be stationary), a pattern of imaged pixels of the sample will be produced which is precisely congruent with the images produced at every other exposure instant and with a precisely consistent relationship between the areas imaged and the height at which the imaging is done. Of course, it is to be understood that the CCD 17 could be articulated or multiplied with additional aperture plate sections to image as many points at as many heights as desired to the same effect as subarrays of the aperture plate 13 being placed at different confocal distances. (However, a change of spacing between aperture plate 13 and the plane of the sensor will introduce a static intensity error since the image will be defocussed to a different degree) In fact, in the preferred form of the camera, one exposure instance (as opposed to an "exposure instant" in which 2048 (128 pixels per line in each of eight raster lines on each side of the transducer, or 1024 per side) of the pixel areas of a sample are imaged at each of sixteen heights; eight time-separated exposure instants being necessary to assemble a complete raster line and deliver brightness signals at a resolution of eight bits.

The operation of the camera, as illustrated in FIG. 2 is greatly simplified to convey an understanding of the nature of data capture by the camera. Different imaged heights within sample 16 are indicated by $h_1$, $h_2$, $h_3$, ..., etc. and areas of the sample (separated by eight pixels in each coordinate direction) are designated with reference characters in the form of geometric shapes (from bottom to top: square, hexagon, circle and triangle). The location of each of these areas at three time-separated (by eight exposures) exposure instants $t_1$, $t_2$, $t_3$ are shown at the left of FIG. 2. The analog outputs of each of the CCD photosites 25a, 25b, 25c are illustrated at the right of FIG. 2. Each of these outputs will consist of a train of analog pulses in which the amplitude of the pulse corresponds to the imaged brightness of an area. As indicated above, due to the confocal imaging technique, this brightness value will also contain height information concerning the location of a partially reflecting surface relative to the imaging depth determined by the position and angular inclination of the aperture plate 13. It should also be noted at this point that as the sample is moved continuously in the direction 23, intervening exposures made at intervening exposure instants between for example, $t_1$ and $t_2$, are at the same confocal heights and locations.

As can be seen, for any exposure instant, a different array of areas will be imaged and each photosite 25a, 25b, 25c of CCD 17 will correspond to a different imaged height (for example, brightness B output of transducer 25c, as a function of time wherein each pulse is of the form B(object pixel position, $h_n$) where the position (e.g. particular pixel position/area of the sample) is, itself, a function of time). Therefore, it is seen at the most simplistic level of abstraction that the interface to the parabola fitting preprocessor must be correlated to a specific area of the sample and therefore must provide a section of the output data taken along chain line 29 corresponding to a plurality of confocal heights at a single pixel location of the sample surface.

Providing such a section of data could ideally be done by simply providing a corresponding set of delays. However, some substantial complicating factors are imposed by the CCD device and the confocal imaging technique. First, it is to be noted that the confocal imaging technique relies on variations of height of partially reflecting surfaces or interfaces from imaged heights to be rendered as defocussed spot images in order to capture height information as intensity values. Therefore, the imaging arrangement must avoid overlapping of defocussed images at the CCD plane and a minimum separation between transducing photosites 25a, 25b, 25c is imposed which is a small multiple of the transverse dimension of a pixel at the sample surface. As a matter of design convenience, a spacing of transducer photosites corresponding to eight pixels in a given coordinate direction at the sample surface is preferred to accommodate this minimum spacing. Therefore, there will be, for example, eight exposure instants (in the major scan direction 23) of different pixel areas between the times a given pixel area is imaged and the instant an adjacent pixel at the sample is imaged.

Second, due to the self-scanning nature of CCD image sensors noted above, the output is not a plurality of parallel outputs of the transducing photosites, but, rather, usually a single serial pulse train. At most, the number of taps which can reasonably be provided is far less than the number of photosites on the transducer. That is, the CCD provides for internal analog signal storage and transfer of analog signal samples between storage sites. Therefore, in operation, a matrix of signals are stepped along rows (or columns) with a column (or row) of data being stepped or swept out of the CCD for each step in the other coordinate direction. In this manner a pulse train is formed containing an output of each transducer in the CCD array or section thereof corresponding to a tap (e.g. all values of B(object pixel position, $h_n$) for a single exposure instant, for example, $t_1$) for each exposure instant. This data from the CCD is then converted from analog to digital form and output as a serial pulse train of binary signal values. At the sampling (e.g. "exposure") rates necessary for throughput useful for automated inspection of samples in a manufacturing environment, the output bit rate of the camera is on the order of 16 Mbytes per second at each of 32 taps for each of the left and right sides, in the preferred embodiment (64 taps). Thus the total output bit rate of the transducer is in excess of one Gigabyte per second.

Figure 3:
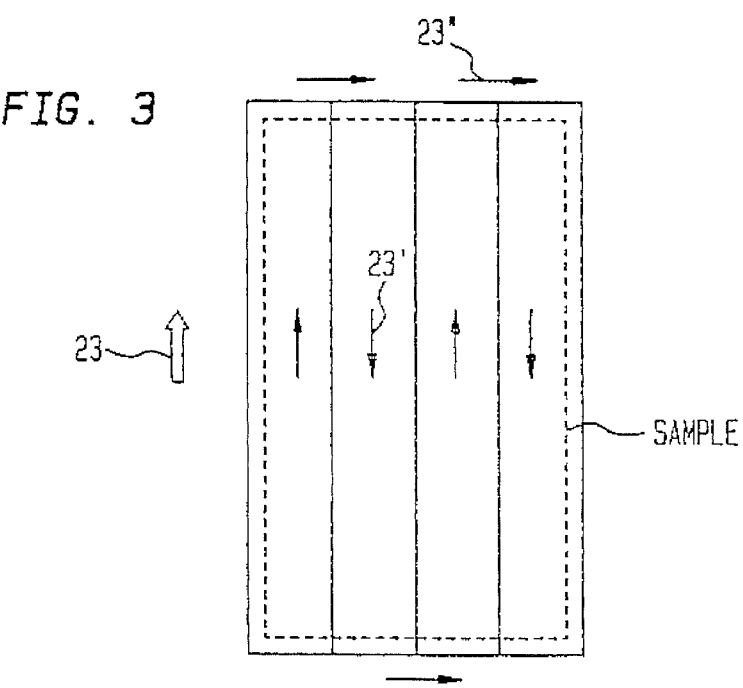
FIG. 3 is an exemplary scan pattern in accordance with a preferred embodiment of the invention.

Third, the sample may not fit entirely within the field of view of the camera, and plural scanning passes over the sample may be necessary. If so, it is desirable to follow a serpentine scanning pattern as shown in FIG. 3, periodically reversing the major scanning direction 23 (e.g. 23') after displacement of the field of view in a direction orthogonal thereto as indicated by arrows 23". This technique is a advantageous since it avoids the time required for repositioning the field of view to the same side of the sample as the preceding scan and, more importantly, allows positional registration between scans to be easily maintained. However, this type of scan pattern also complicates the development of a section of data for a specific location at all imaged heights since the imaged heights will not be developed in order of either height or address on the sample although they must be applied in order of height to the preprocessor disclosed in the above-incorporated, concurrently filed application.

Fourth, CCD's are subject to both noise due to slight differences in sensitivity and dark current of the individual transducing photosites and the efficiency with which charge, representing the sensed illumination brightness level, is transferred from storage structure to storage structure within the CCD. Dark current is the current which will be passed in the absence of illumination and represents a contribution to the conductivity of a transducing photosite which will be substantially constant over all illumination levels of interest. Dark current therefore requires correction in the nature of an offset.

On the other hand, so-called fixed pattern noise is a collective effect of both the light transducing efficiency of the individual photosites and the total charge transfer efficiency of all charge storage devices through which the charge passed as it is shifted or swept from the CCD. (The number of stages through which data from a given transducing photosite passes will vary with the location of the transducing photosite on the CCD. The fixed pattern noise will also vary with each of the individual storage devices in the signal path within the CCD and will be unique for each photosite.) Fixed pattern noise, since it is a lumped efficiency effect, must be corrected by static adjustment of gain for each photosite in the CCD. Since slight instability of illumination can also introduce significant measurement errors, dynamic correction is also desirable.

In view of these complicating factors, it is clear that the development of a section of data corresponding to all imaged heights of a single pixel at the sample is extremely difficult. Doing so for all pixels of a sample in near real time for thorough automated inspection useful in manufacturing environments is even more difficult. The following detailed description of a preferred embodiment of the invention which permits achievement of such a function will now be provided. It is to be understood, however, that some of the sequences of operations and some hardware features which will be described are provided in response to particular scanning patterns and data paths in the presently preferred CCD image sensor arrangement, as will be understood by those skilled in the art, and comparable sequences and hardware features will be apparent to such persons from the following description.

Figure 4:
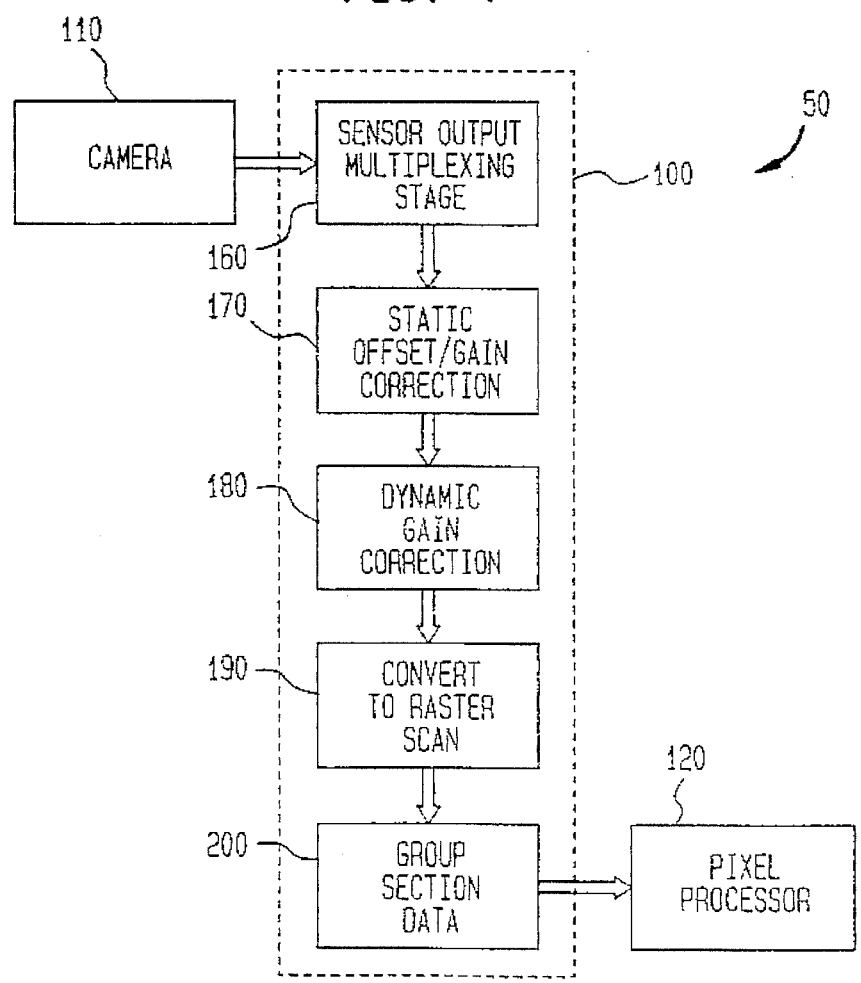
FIG. 4 is a schematic block diagram of the overall arrangement of the invention.

Referring now to FIG. 4, a block diagram of the portion 50 of the automated inspection system extending from the camera 110 through the pixel processor 120 of the above-incorporated, concurrently filed application is shown. The preprocessor 100 of the present invention is indicated by a dashed line and includes a plurality of stages. Sensor output multiplexing stage 160, illustrated in greater detail in FIGS. 6 and 7, performs an initial reordering of transducer photosite outputs for each of a plurality of photosite groups, each group corresponding to a separate nominal confocal height at which imaging is done. A static gain and offset correction stage 170 receives the output of the sensor output multiplexing stage 160 and provides for calibration by adding a component of static gain and a static correction of an empirically determined value to compensate individual photosites for the dark current and fixed pattern noise of each transducing photosite of the CCD. The static gain adjustment may also be used to compensate for transducer spectral response when imaging is done at different wavelengths, as disclosed in the above-incorporated patent application Ser. No. 07/871,458 now U.S. Pat. No. 5,248,816. Dynamic gain correction stage 180 adds a dynamic gain adjustment to compensate for non-uniformity of illumination which may be caused, for example by positional variation of the arc in an arc lamp or other variations which can be measured and used to establish a set point. It should be noted that both of stages 170 and 180 repeatedly apply corrections based upon cyclic repetitions of a micro-order established by the sensor output multiplexing stage 160. This provides a degree of convenience and numbering consistency in addressing look-up tables (LUT's) to obtain correction values in the preferred embodiment.

Raster scan conversion stage 190 converts the micro-order of photosites established by output multiplexing stage 160 (which corresponds to the order of photosites in each imaging height group) to a raster pattern ordered over the entire sample or at least a larger portion thereof. At the same time, since the sensing sites on the CCD transducer 17 are preferably distributed in both coordinate directions to accommodate the enlargement of defocussed images or for other reasons in other application in which a preprocessor in accordance with the invention may be utilized (e.g. collection of optical information which may be distributed in a particular fashion such as by a prism or diffraction grating to yield spectral information rather than the depth information derived by the confocal imaging technique), the raster scan conversion stage also coordinates pixel positions on the moving sample with the transducer photosite which acquires the optical information. Further, the reversal of pixel order is accommodated for bidirectional relative movement between the sample and the camera, as will be discussed below. This results in data which is articulated into sections corresponding to chain line 29 of FIG. 2. However, a time skew will still exist between the values of each section as will be described in greater detail below since each of the sixteen raster scan conversion circuits will be operated with a time offset with respect to other raster scan conversion circuits (different, however, from the time offset depicted in FIG. 2) and corresponding to the time between consecutive exposure instants of a particular pixel location at the sample in the major scan direction 23 corresponding to different confocal heights. This time skew is removed by differential delays in group section data stage 200. Once the time skew is removed, sixteen sets of brightness data of eight bits resolution is output in parallel to the pixel processor 120.

Figure 5:
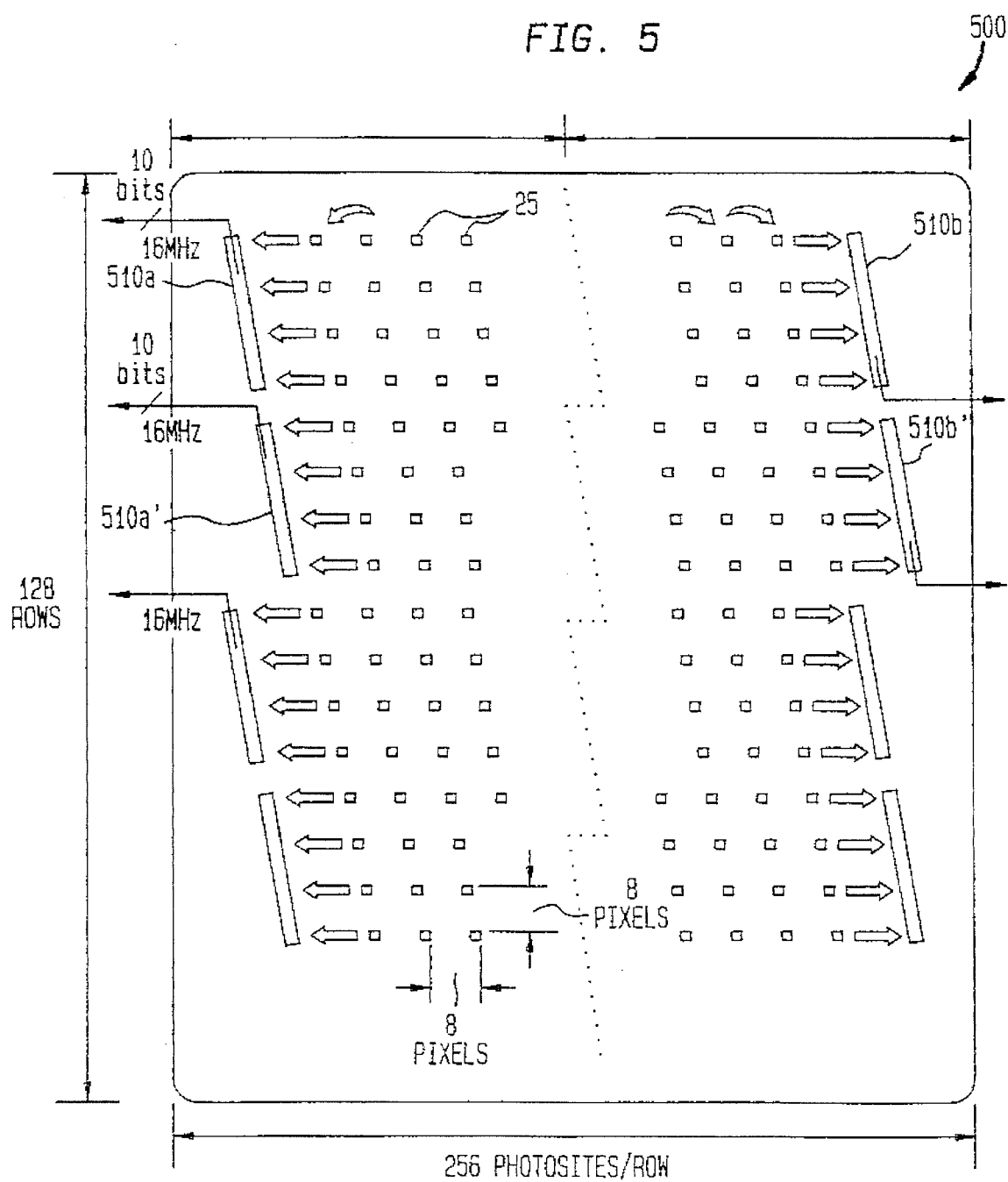
FIG. 5 is a sensor site layout diagram in accordance with a preferred embodiment of the invention.

Referring now to FIG. 5, the sensor photosite layout 500 in accordance with a preferred embodiment of the invention will be described. As mentioned above, the preferred photosite layout is a sparse matrix of photosites since the confocal imaging methodology images variations from imaged height as defocussed spots; the degree of defocussing varying with the variation in height of a partially reflecting surface from the imaged height as determined by the confocal plane 24 of FIG. 2. This defocussing spreads the defocussed spot and reduces the intensity and hence the quantity of light impinging on the fixed area of a transducing photosite 25. For this reason, transducing photosites cannot be contiguous or located within a maximum radius of a defocussed spot from another transducing photosite. In this regard, it should be noted that the maximum radius of a defocussed spot is determined by the full thickness or at least the height range of interest of all potentially reflecting surfaces within the sample and not merely the imaging height range or the distance between imaged heights. Accordingly, as indicated above, a spacing of eight pixel positions (referred to the sample) on-center is provided between transducing photosite locations. This may be more or less than the actual spacing on the sample itself, depending on the camera optics.

The array of photosites is preferably a 256 by 128 photosite matrix, divided into left and right halves in the direction of scanning. Therefore, the field of view of the preferred form of the CCD transducer is 2048 pixels wide with 1024 pixels in each of the left and right halves of the transducer. While not separately illustrated, it is possible to provide further identical arrays to increase the rates of data capture or additional height resolution, if desired. The matrix is further sub-divided into sixteen groups corresponding to different nominal confocal heights (the term "nominal" recognizing a variance of height differences of different rows of a group which are intended to provide imaging at a single nominal height; some aliasing occurring due to the distribution of the photosites in the major scan direction and the inclination of the sample, as discussed in the above-incorporated, concurrently filed U.S. Patent application) of and each group further subdivided into sub-groups of four rows each and providing output to a single tap of the CCD. The matrix is preferably not rectilinear but the columns are preferably inclined (e.g. the photosites are offset from row to row in a direction orthogonal to the scanning direction by a distance equivalent to a width of a pixel at the sample) so that the photosites in a column of a group (e.g. eight pixels wide in a raster line) will cover the width between photosites in rows of the matrix during scanning. It is also to be understood that the array including inclined columns is preferred for convenience but that any array of pixels which, when repeatedly repositioned in the direction of scanning will fully tile the image plane.

Each group of eight rows corresponds to a single nominal imaging height determined by the axial location of a corresponding pixel area on the inclined sample relative to confocal plane 24, thus imaging 2048 (8×128×2) pixel locations on the sample with each exposure. (Each group of the preferred transducer array thus corresponds to a single aperture and transducer of the simplified diagram provided in FIG. 2.) Transducing photosite locations in each row of each group is preferably offset from transducing photosite locations in preceding and following rows by one-eighth the spacing between adjacent transducing photosites (e.g. the nominal transverse dimension of each transducing photosite) to provide imaging over the distance between photosites (e.g. "scanning" in the minor scan direction). For reference, in the preferred embodiment of the invention, the spacing between transducing photosite locations in the CCD is about 80 microns due to the magnification of the camera optics and corresponding to a dimension, at the sample, of about 8 microns. Height spacing between groups of sensor photosites on the transducer depends on sample tilt relative to confocal plane 24 and nominally is in the range of about 0.25 to 2.0 microns.

Each group of eight rows is further subdivided into two sets of four rows each in order to increase output data rates since the outputs of both sets (e.g. all sets) can then be taken in parallel. Incidentally, as is common with CCD's, output of sensed data is shifted toward the edge of the chip by one column (e.g. placing a column of data in a register (e.g. 510a, 510a', 510b, 510b'), as indicated by hollow arrows in FIG. 5, from which it is shifted or swept out at a faster rate in order of row locations. The column-wise shifting and outputting from the register is then repeated cyclically until the entire frame (all photosites on the transducer) has been read out. Then another frame or "exposure" is done and read out in the same fashion. Analog to digital conversion of the pulses is preferably done immediately adjacent the CCD transducer chip in order to minimize pick up of noise. It is also convenient to perform such analog to digital conversion before any storage takes place, such as at buffers 620, 622, 624 and 626 of FIG. 6 so that digital storage and read out may be used.

Figure 6:
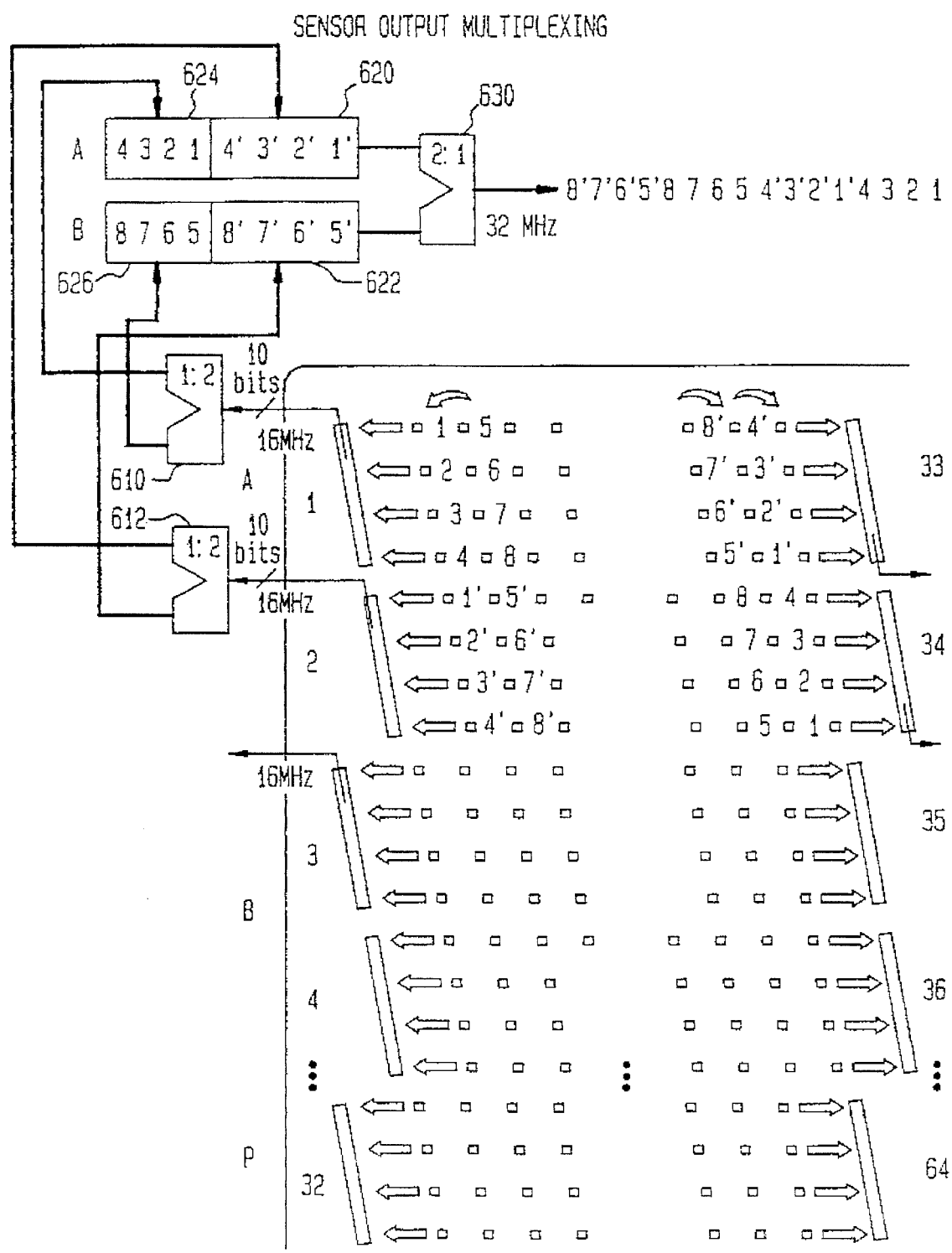
FIG. 6 is a schematic illustration of the sensor output multiplexing stage of FIG. 4.

Since this output structure is somewhat complex, the two halves of the CCD transducer array are formed of rotated images of groups of rows in order to simplify CCD chip fabrication (e.g. exposure of mask resists) which results in reversal of vertical readout order between the left and right halves of the device as indicated by the transducing photosite numbers in FIG. 6. More specifically, with reference to FIGS. 6 and 7, in which a portion of the output multiplexing stage is shown in greater detail, the transducing photosite numbers in the left half of the CCD array are numbered from top to bottom in sets. The right half of the CCD has transducing photosites numbered from bottom to top in sets. In both cases, the second set is identified with an apostrophe (prime). The pixel numbers are thus assigned in the order in which they are output from the CCD. The two sets of data in both the left and right halves of the CCD are read out in parallel to respective 1:2 multiplexers 610, 612 which serve to redirect the outputted data every four pixels to portions of first in, first out (FIFO) buffers 620, 622, 624, 626, which are essentially shift registers, for the left side of the CCD. Incidentally, the reversal of scan order on the left and right sides by columns is of no consequence in the stage of processing to which the present invention is directed since all imaging of photosites in a group are imaging at the same nominal confocal height within the sample. The reversal of order from left to right is of no consequence in the stage of processing to which the present invention is directed and actually assists in minimizing storage and processing requirement since the edge to center order allows outputs of contiguous photosites at the center of the transducer to be read out of the left and right halves simultaneous or sufficiently nearly so for concurrent processing.

The function of the 1:2 multiplexer and the interconnection to these buffers is to realign the columns of pixel data, portions of which are taken in parallel from the CCD. The outputs of these buffers are then output to a 2:1 demultiplexer 630 which receives data from alternate pairs of buffers (e.g. 620, 624 or 622, 626) in eight pixel increments (e.g. columns). Thus, for each group, a continuous stream of pixel data is produced in a column-wise sequence across the CCD from the edge to the center for each exposure. While this sensor output multiplexing is illustrated for only one group of transducing photosites on one side of the transducer, it is to be understood that similar structure is provided for each group which operates precisely in parallel with that described above for the first group.

Figure 7:
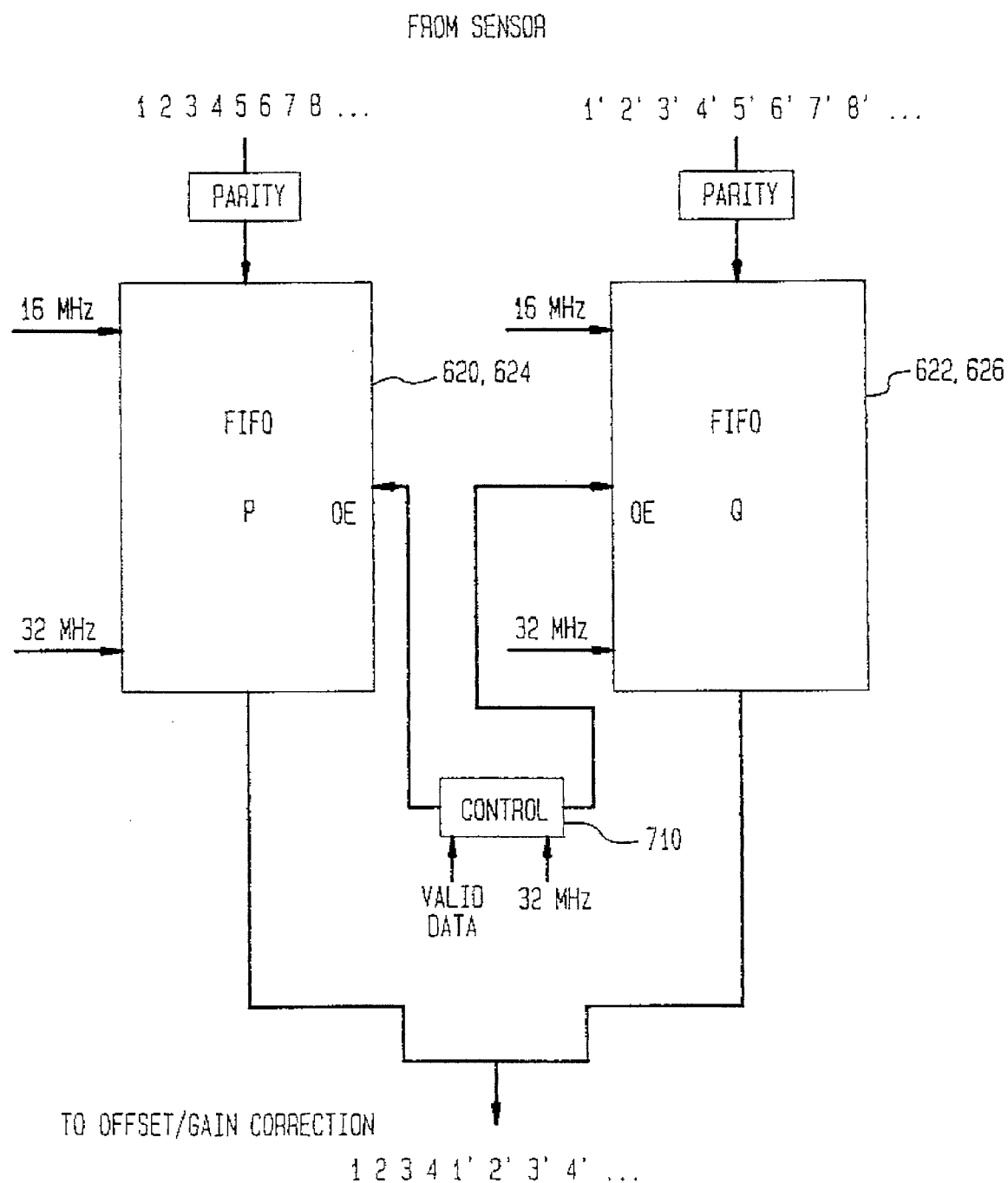
FIG. 7 is a detail illustration of the sensor output multiplexing arrangement of FIG. 6.

It is also to be noted that the data operated on and referred to by a single pixel number is a plurality of digital bits (preferably nine bits and a parity bit) required to express the transduced brightness value with the desired degree of resolution. Since the output of each of the multiplexers 630 is a digital value representing high accuracy data output at a very high data rate (e.g. 32 MHz), it is also preferred to provide for error checking by the addition of a parity bit at the earliest possible point in the data path. Therefore, it is preferred to add parity bits and to check parity at the input to the FIFO buffers 620, 624 and 622, 626, as shown in FIG. 7. Output of these buffers is clocked at 32 MHz, to correspond to the 16 MHz output of the A/D conversion of the CCD output as the contents of the FIFO buffers 620, 624 and 622, 626 are merged. The 2:1 demultiplexer is preferably embodied by providing alternative output enable control of the FIFO buffers at 710 of FIG. 7 to merge the contents in groups of four photosites to result in the sequence 1, 2, 3, 4, 1', 2', 3', 4', ..., as shown. The valid data input to control 710 synchronizes the start of generation of pixel count values (PVAL) with the readout operation of the CCD.

Figure 8:
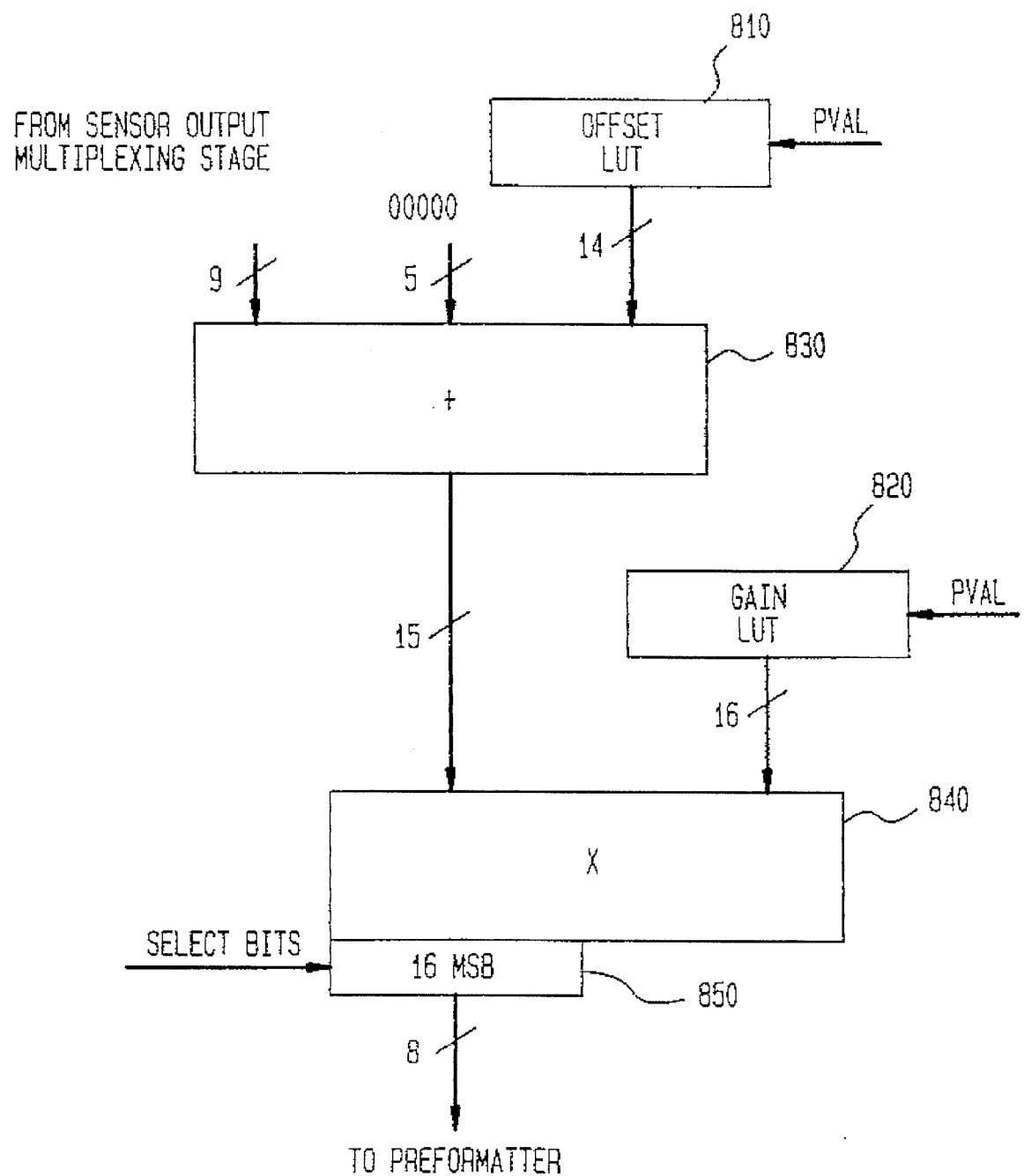
FIG. 8 is a schematic diagram of the static offset and dynamic gain correction stages of FIG. 4.

Referring now to FIG. 8, the static gain/offset correction stage 170 and dynamic gain correction stage 180 will now be explained. It is to be understood that the corrections which are unique to the transducers (e.g. the transducers themselves or the data paths through the CCD to outputs thereof) will recur cyclically in synchronism with the CCD output and are independent of scanning over the sample. The pixel location value (PVAL) within each group can thus be provided by a counter since the sensor output multiplexer stage 160 has established a column-wise micro-order, as discussed above. PVAL can thus be used to directly address offset LUT 810 and gain correction LUT 820, to provide digital correction values. Correction values are provided for other groups on each of the left and right sides of the transducer 17 by multiplication of the structure of FIG. 8 and therefore only correction for the number of pixels in each group is provided by the look up tables 810, 820. In this regard, it is to be understood that the structure described is replicated for each pair of taps (corresponding to a group) of the CCD. Therefore each of the arrangements of FIGS. 7–9 and the demultiplexer of FIG. 6 appears 16 times in the preferred embodiment.

To perform correction for offset, an adder 830 is provided with inputs of the nine data bits from the sensor output multiplexing stage which is then padded with five digits of zero value to match the resolution of the correction information and 14 bit offset or dark current correction values from look up table 810. It should be noted that while a digital adder is preferred, many structures can perform such a function, including the simple attachment of less significant bits if the maximum correction value is smaller or only slightly larger than the resolution of the data.

The output of this adder is then provided at 15 bits resolution to multiplier 840 which also receives gain correction data at 16 bits resolution from look up table 820. The output of the multiplier (thirty one bits) is truncated to sixteen most significant bits of corrected data. From this sixteen bits, eight bits are then selected to provide maximum dynamic range for the particular sample and are then output by bit selector 850 to the preformatting raster scanning stage 190 which will now be discussed in connection with FIGS. 9–15. This selection is done to reduce the number of bits carried forward while maintaining the dynamic range of the data since a very bright sample would contain most information in the most significant eight bits whereas a very dark sample would contain most information in the least significant bits of the 16 most significant bits to which the output by the multiplier 840 is truncated.

It is to be noted that dynamic correction of data is provided in much the same way or even by the apparatus of FIG. 8 by dynamic correction of values in the look-up tables or in other ways which will be evident to those skilled in the art in view of the present disclosure. While it is considered important to obtaining the full accuracy of which the invention is capable that dynamic correction be provided, the details of the dynamic correction are not critical to the practice of the invention for collation of data.

Figure 9:
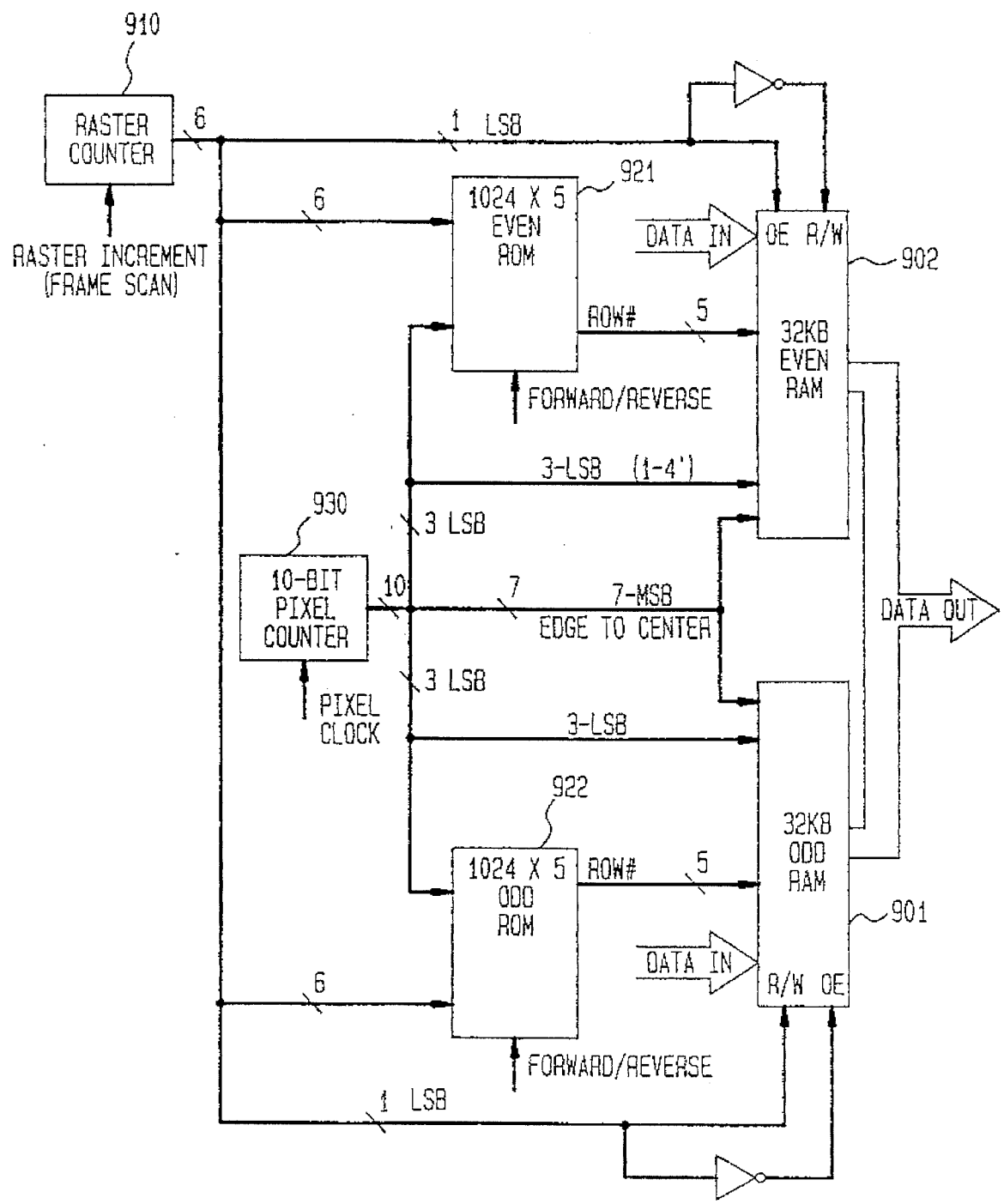
FIG. 9 is a schematic diagram of one of sixteen identical preformatter circuits for the raster scan conversion stage of FIG. 4.

The basic function of the apparatus of FIG. 9 is to convert the coordinates of the actual locations of transducing photosites of transducer 17 to locations within a matrix of image pixels which will represent the imaged data and which can be scanned in row and column order for utilization by a reproduction device or image analysis processing apparatus. This process essentially is a collation of photosite output data to place it in raster order. It is to be noted in this regard that since the sparse matrix of the transducer was read out in row and column order of the transducer, as required by the desired CCD configuration, the pattern of transducer locations is implicit in the order of data at the output of the correction stage and thus is substantially a template of the array of transducer photosites, as will be further discussed in regard to FIG. 11.

In essence, the apparatus of FIG. 9 includes a pair of random access memories (RAM) 901, 902 which are operated in a ping-pong or double buffer (e.g. with at least two independently operable buffers) fashion to provide simultaneous write and read. The RAMs are addressed in part by a raster counter, a least significant bit (LSB) of the output of which also controls the read/write (R/W) function of RAMs 901 and 902. The remainder of the address is preferably supplied by read only memory (ROM) or programmable read only memory (PROM). It is also convenient, with binary addressing, to provide both RAMs and ROMs as odd and even RAMs and ROMs, the R/W function of the RAMs toggling with the least significant bit of the raster count. The remainder of the address is provided by a pixel counter running synchronously with the raster counter and the read out of the transducer 17.

The pixel counter essentially serves to identify the pixel information as it arrives in sequence at the input of RAMs 901 and 902 in the order in which it was read out from the transducer 17 and the demultiplexer of FIG. 6. Thus, for the preferred transducer, the seven most significant bits (MSB) are used to identify locations from the edge to the center of the pixels within a group (and hence 32 of the circuits of FIG. 9 are provided) and the three least significant bits cycle through the eight rows of each group as reordered by the demultiplexers of FIG. 6 (which also is in edge to center order across the preferred transducer and correspond to contiguous pixels in the raster and image). Since the raster defined by the raster scan counter is also cyclical, the combination of both counters is also cyclical (regardless of the order of the pixels within the particular raster or from the particular transducer array) as shown in Table 1 of FIG. 11.

Referring briefly to FIG. 10, the numbering conventions used in regard to the following discussion of the operation of the apparatus of FIG. 9 will now be discussed. FIG. 10 shows the first 58 of 64 rows of the left half of one group of the transducer of FIGS. 5 and 6, containing 1024 transducing sites numbered 0–1023. Row numbers corresponding to the raster but referred to the sample surface which are imaged during an exposure instant are indicated at the left in FIG. 10 and are repeated every 64 rows (with incrementing or decrementing of more significant bits). It should be noted, as indicated above, that the pixel numbers, when associated with rows of the output raster precisely follow the pattern of transducing photosites formed on CCD transducer 17. This is so because of the relationship of the actual locations imaged by a group which requires essentially eight cycles to cover the portions of a raster line between pixels imaged at each exposure instant and eight exposures between the exposures of adjacent pixels in the same raster line, during which other exposures will be made at other locations in the major scanning direction (e.g. areas 29 in FIG. 2) as they pass through the confocal imaging locations.

Table 1, shown in FIG. 11, shows the cyclical nature of the transformation required of the raster scan converter. Listing the pixels of FIG. 10 in order from 0 to 1023 in the left column, the raster scan image row will show a repeated sequence of numbers, each incremented by eight from the previous number and returning to zero when 64 is reached. The transducing photosite location within each eight pixel wide segment of the raster line (the Y photosite number along a column of the transducer photosite array) is a repeating sequence of the numbers 0–7 corresponding to the rows within a group of transducer 17. The X photosite number is incremented for each of the 128 cycles of the Y photosite number ranging from 0 to 127 across the transducer from edge to center. Thus it is seen that the data from the preferred CCD transducer can be tiled into the raster within a single cycle of the raster scan, although it is to be understood that this feature is not necessary to the practice of the invention. Nevertheless, since the number of pixel data from the transducer is the same as the number of pixels in the raster scan it is clear that the invention will be able to tile the raster with transducer output in an integral number of raster patterns as long as the pattern of transducing sites of transducer 17 will tile the image plane when shifted in an orderly pattern of orthogonal displacements.

In the preferred embodiment of the invention, the orderly displacements are as shown in FIG. 3 and discussed above. More specifically, the shifts during which optical sensing is done are shifts in forward and reverse directions along a single direction interspersed with shifts in an orthogonal direction by a distance equal to the field of view when no optical sensing is done. In order to achieve the desired conversion, in this preferred case, the addresses which must be supplied by the ROMs 921 and 922 must accommodate three two-fold conditions: direction of scan, odd/even photosite lines and left and right halves of the transducer. That is, eight different pixel order conversion patterns. However, since the left and right halves of the transducer are handled by separate raster scan conversion circuits, the pixel position conversion patterns for the left and right halves of the transducer need not be provided in the same ROMs. In fact, some later processing operations are simplified by maintaining edge to center sequences at this stage since data from center pixels may be more easily correlated, as indicated above. The conversion patterns which must be supplied are therefore limited to four conditions in the preferred embodiment of the invention and these patterns are given in tables 2–5 of FIGS. 11–15, respectively. It will be sufficient for the practice of the invention by those skilled in the art to understand the rationale by which these tables are generated for the preferred form of the transducer in regard to several features of the pattern of addresses contained in these tables, as will now be described.

Different numbers of photosites, rows and/or columns per subgroup will affect only the organization of cycles such as that shown in Table 1 of FIG. 10 for the preferred embodiment from which Tables 2–5 directly follow. Since any pattern which will tile the image plane can be reconciled with the preferred form of the invention by comparing the position of the photosites and location within the readout sequence, all other patterns of photosites having the same number of photosites, rows and columns per subgroup which will tile the imaged surface with an orderly sequence of orthogonal shifts can be accommodated by increasing or decreasing the partial addresses in tables 2–5 by amounts corresponding to the difference in location or sequence of each photosite. This can be simply implemented in hardware by providing decoders for an appropriate number of the least significant bits of the ROM inputs or outputs since there would be a one to one correspondence therebetween. The number of bits for which such a decoder would be required would vary with the extent of a single repeat of the pattern corresponding to a group. Further, different patterns could be provided for each group and accommodated with different decoders but may introduce complications since, after the acquisition of line 57 by photosites 7, 15, 22, . . . 1023 photosites 0, 8, 16, . . . , 1016 of an adjacent transducer group begin imaging within the same raster line and would acquire data in a different order which would be difficult to accommodate in the post processor 200. Therefore it is much to be preferred that transducer patterns be consistent on right and left halves of the transducer.

Comparing pairs of tables in accordance with the preferred embodiment of the invention such as table 2 and table 3 (or table 4 and table 5) corresponding to odd and even ROMs or RAMs, respectively, it is first to be noted that each raster line count (e.g. from 0 to 64) is designated as either read or write and that a line designated as a read address in one table is designated as a write in the other. This feature accommodates the ping-pong operations of the RAMs and ROMs which is done to achieve simultaneous read and write functions. Additionally, it should be noted that the address values in the raster lines designated read are the same for all columns in the table corresponding to the cyclic pixel numbers. Correspondingly, as follows from the cyclic pattern of FIG. 10, write lines contain ascending or descending sequences of addresses from 0 to 64 separated by eight. The ascending/descending quality is determined from whether the scan is in the forward or reverse direction (descending for forward, ascending for reverse). Alternating between odd and even tables in write lines, the sequence of addresses increments by 1 over the sequence of write lines in each column of the pair of tables (e.g. Table 2, raster line 0, pixel 0 is 0, Table 3 raster line 1, pixel 0 is 1, Table 2 raster line 2, pixel 0 is 2, and so on). Similarly the addresses for the read lines follow a similarly incremented cycle of numbers from 0–63, as indicated in the tables. Line 57 of each of Tables 2–5 is of interest since, upon writing of data from photosite 1023 in line 56, data for the scan line of the raster will be complete and readout may immediately begin as can be seen from the address of 0 in the first pixel location (0) for read addresses for line 57 in each of Tables 2 and 4. Since the transducer is rotationally rather than bilaterally or mirror symmetrical (e.g. the right half is identical to the left half but rotated by 180°) the same tables can be used for forward scan, left half and reverse scan, right half, as indicated in FIG. 12 and the other combinations shown in FIGS. 13–15.

In operation in accordance with the preferred embodiment of the invention, the ROMs, during the write cycle receive the 3 least significant bits of the output of pixel counter 930 and essentially substitute an address extending over the 1024 location of a raster line. This is preferably applied to the RAMs as a partial address in conjunction with the three least significant bits of the pixel counter output to effectively multiply and offset the location and to cause entry of adjacent transducer outputs at raster locations separated by eight raster lines through an array of 64 raster lines in ascending/descending order, depending on scan direction and repeating through those raster lines with an offset for each raster pixel. During the read cycle, a row of the RAM is read out as it is accumulated and therefore the memory capacity requirements (e.g. the field of the image held in memory at any given instant) of the RAMs is minimized.

It is also to be understood that the even and odd ROMs function substantially as high speed decoders or code converters but which provide a different code (address) conversion in dependence on whether its corresponding RAM is being written to or read from. It is this switchable correlation or address conversion function which provides proper collation of data in a manner which supports the extremely high speed of operation to match the gigabyte speed of the transducer output in order to provide essentially real time automated optical inspection necessitated by production environments. While it is preferred to perform this conversion on the write cycle of the RAMs, it is to be understood that the same result could be achieved by performing the same operation on the read cycle.

Figure 16:
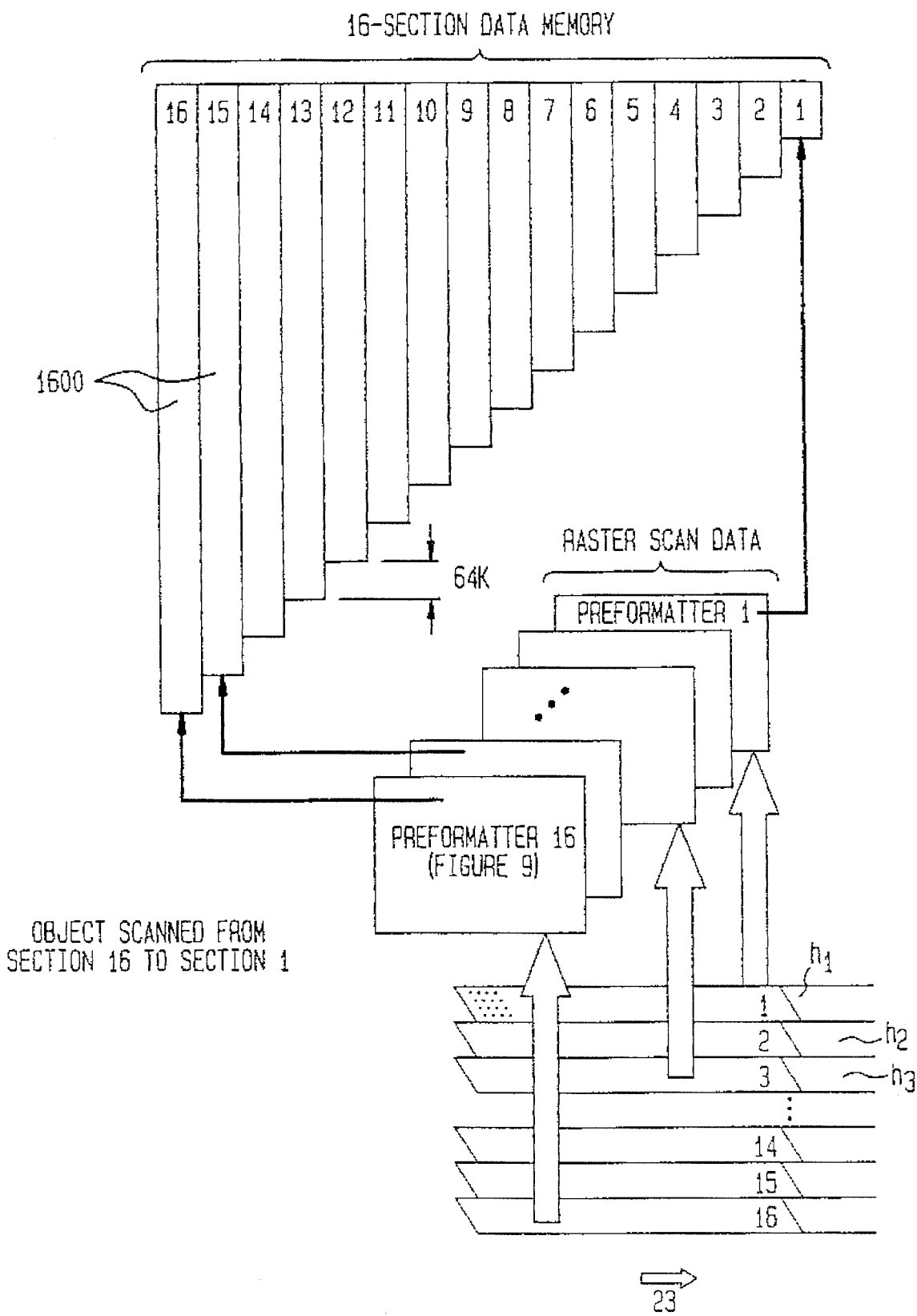
FIG. 16 is a schematic diagram of the postformatter arrangement for the group section data stage of FIG. 4.

Referring now to FIG. 16, the post processor in accordance with the invention will now be explained. It will be recalled that the transducer photosite array is divided into groups, each of which performs imaging at a different nominal confocal height within the sample. This array preferably repeats every 64 raster lines as defined in FIG. 10. Therefore there will be a time separation of 64 pixel lines between contributions to pixel values at each height in a given raster line. Since these values are now in correct raster order within each half of the field of view and contain 1K (1024 bytes), there must be a 64 Kbyte delay between each height. These delays are preferably cumulative to correspond to the sequential orientation of groups in the scan direction. By the same token, it should be noted that the illustration of FIG. 16 is for the forward scan direction and the order, by nominal confocal height, of application of data to the delay lines 1600 and numbered 1–16 must be reversed for scanning the sample in the reverse direction 23' (FIG. 3), as may be done with a simple switching array.

Since the cumulative delays provided by the delay lines 1600 are relatively long and must be precisely controlled, FIFO buffers are preferred since they may be clocked. By thus providing cumulative delays differing by 64 Kbytes from delays imposed on adjacent groups, pixel values for all sixteen confocal heights imaged by the respective groups may be brought together in the same raster line and made available to the height processor disclosed in the concurrently filed patent application incorporated by reference above. (This is distinct from the operation of the so-called time displacement integration (TDI) CCD where, by shifting, data for a single pixel receives contributions from different photosites while being shifted out of the CCD since, in accordance with the invention, the data of different groups of photosites and nominal confocal heights remains distinct for each pixel.) That is, data corresponding to variances from sixteen nominal confocal imaging heights is presented in parallel for each of 2048 pixels per line at an intensity/height resolution of eight bits. Thus adjacent intensity data for surfaces at different heights within a sample pixel are available in parallel for parabola fitting or other suitable processing for locating the precise height within the sample of any partially reflecting surface which may be present. Since these data are presented in parallel, no further storage beyond buffering to maintain synchronization is required and the height processor is able to operate on this information in near real time and at speeds which do not adversely throughput of manufacturing processes.

In view of the foregoing, it is seen that the present invention provides a technique of scan conversion at extremely high speed and extreme volume. The 32 MHz data rate is maintained synchronously throughout the reformatting of data from each data tap and an overall throughput in excess of 1 gigabyte per second is obtained with relatively small memory and other hardware requirements.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of operating a memory to store and access data in a field thereof including the steps of:

providing at least two sequences of numbers as partial addresses for said memory, the combination of said partial addresses forming an address sequence identifying all memory addresses in said field of said memory; and altering at least a portion of said address sequence to form an altered address sequence during one of write and read operations in said memory, said altered address sequence identifying all addresses in said field of said memory;

at least one of said address sequence and said altered address sequence identifying all addresses in said field of said memory in a non-sequential order of numerical address, wherein said memory includes at least two independent buffers and wherein said method includes the further step of simultaneously writing to one of said independent buffers and reading from another of said at least two independent buffers.

2. A method of operating a memory to store and access data in a field thereof including the steps of:

providing at least two sequences of numbers as partial addresses for said memory, the combination of said partial addresses forming an address sequence identifying all memory addresses in said field of said memory;

altering at least a portion of said address sequence to form an altered address sequence during one of write and read operations in said memory, said altered address sequence identifying all addresses in said field of said memory;

at least one of said address sequence and said altered address sequence identifying all addresses in said field of said memory in a non-sequential order of numerical address; and controlling the read and write operations of said memory in accordance with a least significant bit of one of said at least two sequences of numbers.

3. A method as recited in claim 1, including the further step of controlling the read and write operations of said at least two independent buffers in accordance with a least significant bit one of said at least two sequences of numbers.

4. A method of operating a memory to store and access data in a field thereof including the steps of:

providing at least two sequences of numbers as partial addresses for said memory, the combination of said partial addresses forming an address sequence identifying all memory addresses in said field of said memory;

altering at least a portion of said address sequence to form an altered address sequence during one of write and read operations in said memory, said altered address sequence identifying all addresses in said field of said memory;

at least one of said address sequence and said altered address sequence identifying all addresses in said field of said memory in a non-sequential order of numerical address; and merging at least two input data streams by alternately selecting a fixed plurality of data bits from each of said two input data streams.

5. A method of operating a memory to store and access data in a field thereof including the steps of:

providing at least two sequences of numbers as partial addresses for said memory, the combination of said partial addresses forming an address sequence identifying all memory addresses in said field of said memory;

altering at least a portion of said address sequence to form an altered address sequence during one of write and read operations in said memory, said altered address sequence identifying all addresses in said field of said memory;

at least one of said address sequence and said altered address sequence identifying all addresses in said field of said memory in a non-sequential order of numerical address; and wherein said method is performed on at least two memories and including the further step of:

delaying the output of one of said at least two memories.

6. A method as recited in claim 5, wherein said delay is for a time approximately equal to a duration of said address sequence for identifying of all said addresses in said field of one of said at least two memories.

7. A method of operating a memory to store and access data in a field thereof including the steps of:

providing at least two sequences of numbers as partial addresses for said memory, the combination of said partial addresses forming an address sequence identifying all memory addresses in said field of said memory;

altering at least a portion of said address sequence to form an altered address sequence during one of write and read operations in said memory, said altered address sequence identifying all addresses in said field of said memory;

at least one of said address sequence and said altered address sequence identifying all addresses in said field of said memory in a non-sequential order of numerical address;

wherein said step of altering said at least a portion of said address sequence to form an altered address sequence includes the steps of:

storing a pattern of addresses in a second memory, said pattern of addresses including all addresses in said field, applying at least selected bits of said address sequence to said second memory to access said stored pattern of addresses, in sequence, and applying said stored pattern of addresses to said memory during one of read and write operations of said memory to access all data in said field.

8. A high speed scan converter comprising a memory including at least two buffers, a first counter for generating a first sequence of multi-bit digital addresses, a second counter for generating a second sequence of multi-bit digital addresses, said second counter operating synchronously with said first counter, means responsive to at least one selected bit of one of said first and second sequences of multi-bit digital addresses for causing a write operation in one of said at least two buffers simultaneously with a read operation in another of said at least two buffers and means for accessing a field of data in said memory in accordance with said first and second sequences of multi-bit addresses, said means for accessing a field of data including means for substituting an altered pattern of addresses for at least a portion of at least one of said first and second digital address sequences during one of read and write operations of said at least two buffers.

9. A scan converter as recited in claim 8, wherein said first counter is a raster line counter and said second counter is a pixel counter.

10. A scan converter as recited in claim 8, further including means for merging at least two input data streams into a single data stream applied in parallel to said at least two buffers.

11. A scan converter as recited in claim 8, further including means for delaying data read from said memory by a time period equal to and integral multiple of a time period for accessing said field of data.

\* \* \* \* \*